No. 26,747. J. BRYANT. PATENTED JAN. 10, 1860.
ANTIFRICTION JOURNAL BOX.
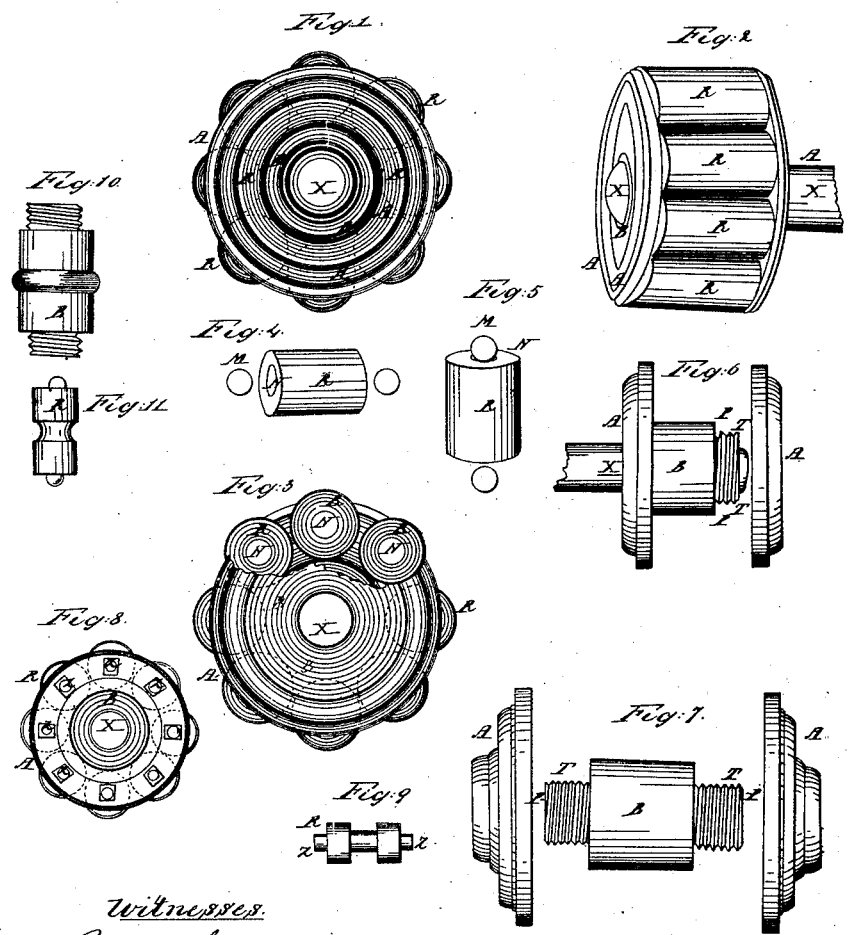
Witnesses.
Inventor
Joel W. Bryant,

UNITED STATES PATENT OFFICE.

JOEL BRYANT, OF BROOKLYN, NEW YORK.

JOURNAL-BOX.

Specification of Letters Patent No. 26,747, dated January 10, 1860.

*To all whom it may concern:*

Be it known that I, JOEL BRYANT, of Brooklyn, in the county of Kings and State of New York, have invented a new and Improved Mode of Constructing Journal-Boxes; and I hereby declare that the following is a full and correct description thereof, sufficient to enable others skilled in the art to make and use my invention, reference being made to the accompanying drawings, and to the figures and letters marked thereon, forming a part of this specification.

Figure 1 is a perspective view of my improved journal box. The letter A refers to the side pieces (A) and the letters R to the friction rollers (R), letter X to the axle of journal provided with said box, and the dotted lines to the central base B, not shown in this figure (Fig. 1), except by the dotted lines, which indicate the position of the said base B in my improved journal boxes.

Fig. 2 represents the side pieces A and the said central base B of my improved axle or journal boxes, as shown in perspective by Fig. 1.

Fig. 3 represents a side view of one of my improved journal boxes (Fig. 1) with the front side piece (A) removed. This figure (Fig. 3) clearly shows the said central base B and the way in which the friction rollers R rest and roll thereon without coming in contact with the axles or journals (X) provided with the said boxes, as shown in Fig. 1.

Fig. 4 represents the said central base B as disconnected from the side pieces A and indicates how it may be connected with the said side pieces A, to wit, by screw threads formed on projections (with a shoulder) on the ends of the base.

Fig. 5 represents a section of an axle or journal (X). The said Fig. 5 when viewed in connection with Fig. 2 indicates the way in which the said journal boxes (Fig. 1) are set upon axles or journals (X), to wit, by being permanently secured in the opening Z (formed to receive the axle X) in the center of the (otherwise solid) central base B.

Fig. 6 has nothing to do with my invention further than simply to indicate (what perhaps is sufficiently obvious) how the said boxes (Fig. 1) may be set in their cases, which may be made of any desirable shape or size adapted to purposes for which the said journal boxes (Fig. 1) may be required.

My improved axle or journal boxes (Fig. 1) may be made of any desirable size or number of rollers R, so set within the said boxes as to rest and roll on the said central base B without coming in contact with the axles or journals (X) on which the said journal boxes (Fig. 1) are set, and the said rollers R may be set and secured in the said journal boxes (Fig. 1) like as in other journal boxes, providing the said rollers R rest and roll freely on the said central base B, which constitutes the chief merit and distinguishing characteristic of my improved journal boxes (Fig. 1) and by which (central base B) they may be known and distinguished from other friction roller journal boxes.

The advantages of my invention are that my improved journal boxes (Fig. 1) may be readily and strongly secured to the axles or journals provided therewith through the medium of the strong central base B, and as the said central base (B) prevents the the said friction rollers R from coming in contact with the axle or journals provided therewith there consequently will be no wear upon the said journals in the use of my improved boxes, and, as is obvious, the said base B, being considerably larger in circumference than the axle or journal for which the said boxes are required, the said friction rollers R will roll much easier on the said base B than on an axle, where the rollers leave spaces between them, into which the axle or journals press, so as to make an unsteady action for the axle, as also to engender friction.

My improved boxes (Fig. 1) will enable the axle or journal to run more steadily and with less friction, the rollers having a larger base.

I am aware that there is nothing new in the use of friction roller journal boxes; but I am not aware that they have (prior to my invention) ever been made with a central base B, as herein described. Consequently, disclaiming all other modes of constructing friction roller journal boxes as hitherto known and used, I desire to secure by Letters Patent what I herein claim as my invention, to wit:

I claim—

The construction and use of friction roller journal boxes (Fig. 1) when made with a central base (B), substantially as herein described.

JOEL BRYANT.

Witnesses:
MELANCTON BRYANT,
CHARLES LEECH.